May 28, 1957    J. H. FULPER    2,793,735
COUNTERBALANCE MECHANISM FOR TILTING HOPPER CONVEYOR
Filed July 29, 1953    3 Sheets-Sheet 1

INVENTOR.
John H. Fulper
BY
Eberhard E. Wetley
Atty.

May 28, 1957     J. H. FULPER     2,793,735
COUNTERBALANCE MECHANISM FOR TILTING HOPPER CONVEYOR
Filed July 29, 1953     3 Sheets-Sheet 2
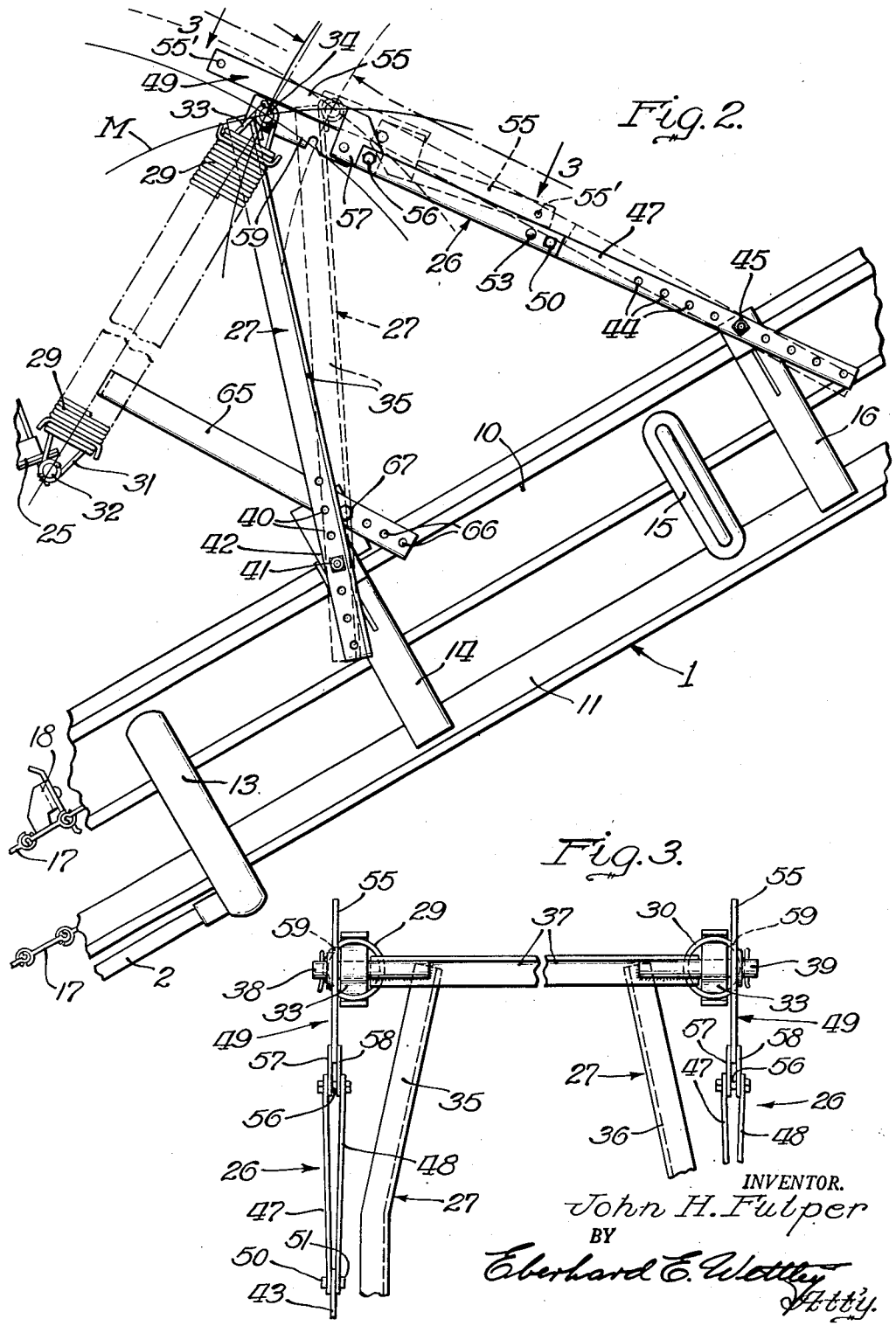
INVENTOR.
John H. Fulper

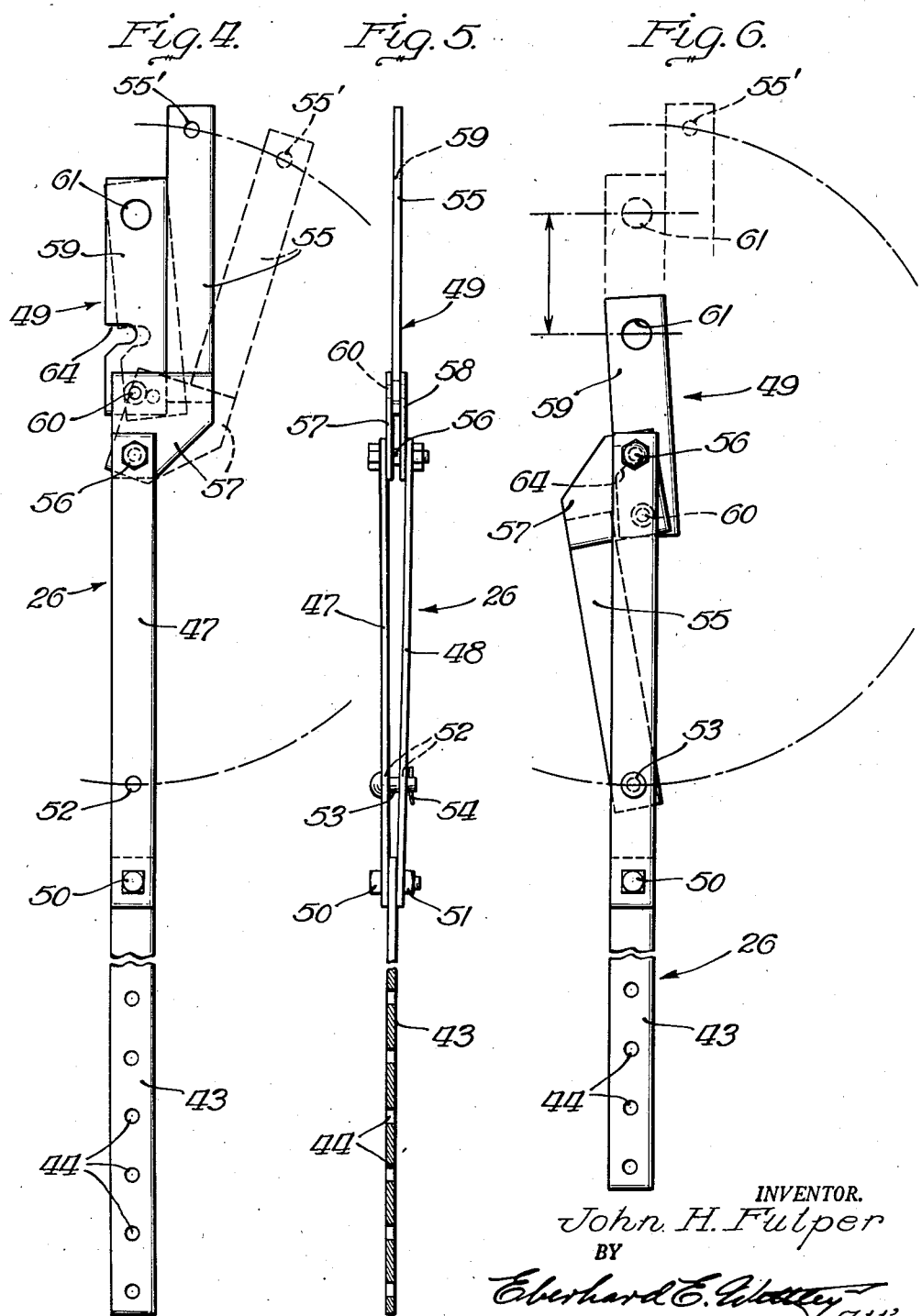

United States Patent Office

2,793,735
Patented May 28, 1957

2,793,735

COUNTERBALANCE MECHANISM FOR TILTING HOPPER CONVEYOR

John H. Fulper, Kewanee, Ill., assignor to Kewanee Machinery & Conveyor Company, Kewanee, Ill., a corporation of Illinois Application July 29, 1953, Serial No. 371,122

8 Claims. (Cl. 198—98)

This invention relates to conveying equipment and in general to a counterbalancing construction and arrangement associated with a tilting hopper connected with an elevator.

More specifically, the present invention is directed to a mobile or portable conveyor as a material elevator for moving material between two predetermined locations and wherein a material receiving hopper is connected to one end of the conveyor through pivotal means so that this tilting hopper can be moved from operative to inoperative positions according to conditions of operation. As a general rule, conveyors of this type provide an elevator which is angularly supported in relation to the ground or other surface, and wherein the tilting hopper is swung from a position above the attached end of the elevator to an outstretched prone or operative position upon the ground ahead of this elevator which comprises the material receiving position for feeding the conveying mechanism in the elevator.

In conveyors of this type and particularly wherein relatively long tilting hoppers are utilized, it has always been a problem to raise this hopper from the ground engaging position into an upright position above the framework of the conveyor which is the position the hopper occupies during nonuse or transportation of the conveyor or while driving the next loaded vehicle into position for unloading.

It is one of the main objects of the present invention to incorporate counterbalancing mechanism which is constructed and arranged to lend itself to manual operation requiring comparatively effortless procedure to move a heavy tilting hopper from its operative position to an upright stored position above the conveyor or vice versa. In prior constructions various spring mechanisms have been employed but they have been generally inefficient in performing a complete job. Such prior mechanisms usually introduce a certain amount of spring action to start a tilting hopper conveyor off of the ground, but generally became ineffective as the conveyor is partially raised so that the balance of the procedure always required further external force too great for one man or other power means to actually lift the tilting hopper to fully raised position and therebeyond until the same would come to rest in a fixed upright stored location with respect to the conveyor.

With the present invention, the entire spring mechanism and the tilting hopper controlling arrangement has been so devised and designed as to provide a continued effortless movement of the hopper into its two extreme positions or into any intermediate position that this unit may occupy.

It is another object of the counterbalancing means of the present invention to provide mechanical aid for helping an operator start the hopper down from an upright position to the ground position.

It is a further object of the present invention to provide cooperative bracket mechanisms functioning as spring securing means wherein such means can be adjustably carried upon the conveyor proper to obtain the best functioning angles of operation of the springs utilized in the counterbalancing mechanism whenever the angle of elevation of the conveyor is changed with respect to the ground. Obviously, this adjustable bracket arrangement is rendered feasible for the various angular positions of the main trough or frame of the conveyor when in its normal adjusted angular positions in respect to the ground which may vary anywhere from 15 to 20 degrees and up to 35 to 40 degrees.

It is another object of the present invention to provide suitable mechanism for conveniently assembling the counterbalancing structure of the present conveyor without special tools or means for connecting the springs into their operative relationship between the tilting hopper and its associated elevator and spring bracket supporting means.

In conveyors of this particular construction, and more specifically in conveyors related to moving materials on a farm, it is the usual practice to ship such conveyors in disassembled sections to be set up by the operator or farmer who receives such a structure. With this in mind, the entire counterbalancing structure as herein designed includes all the necessary relationships between the elements comprising the finished construction wherein relatively heavy springs can be assembled manually and efficiently to thereafter function in their designed capacity in moving the tilting hopper between its various usable and nonusable positions in connection with the conveyor.

It is a further object of this invention to provide relatively simple and easily operable back stay or bracket assembly structure that forms an over center locking means for bringing the springs from their initial assembled relation into operative connected relation with their connected associated parts so as to function in the capacity in which they were designed. This back stay or bracket assembly lends itself conveniently to the assembly and disassembly of the mechanism at any time for maintenance and servicing or for replacing either or both of the springs which form the main elements of the conveyor for the tilting hopper.

Other objects and advantages relating to the cooperative balancing means interposed between the conveyor and the tilting hopper shall hereinafter appear in the following detailed description having reference to the accompanying drawings forming a part of the specification.

In the drawings:

Figure 2 is a further fragmentary side elevational view on a larger scale showing the counterbalancing mechanism in greater detail;

Figure 3 is a transverse plan view fragmentarily showing the spring connections of the counterbalancing unit and the associated back stay or bracket structure as connected with the conveyor;

Figure 4 is a side elevational view of one of the back stay units illustrating this entire unit as disassembled from the conveyor structure and with the over center tensioning and assembling structure disposed in its normal inoperative and spring receiving position;

Figure 1:
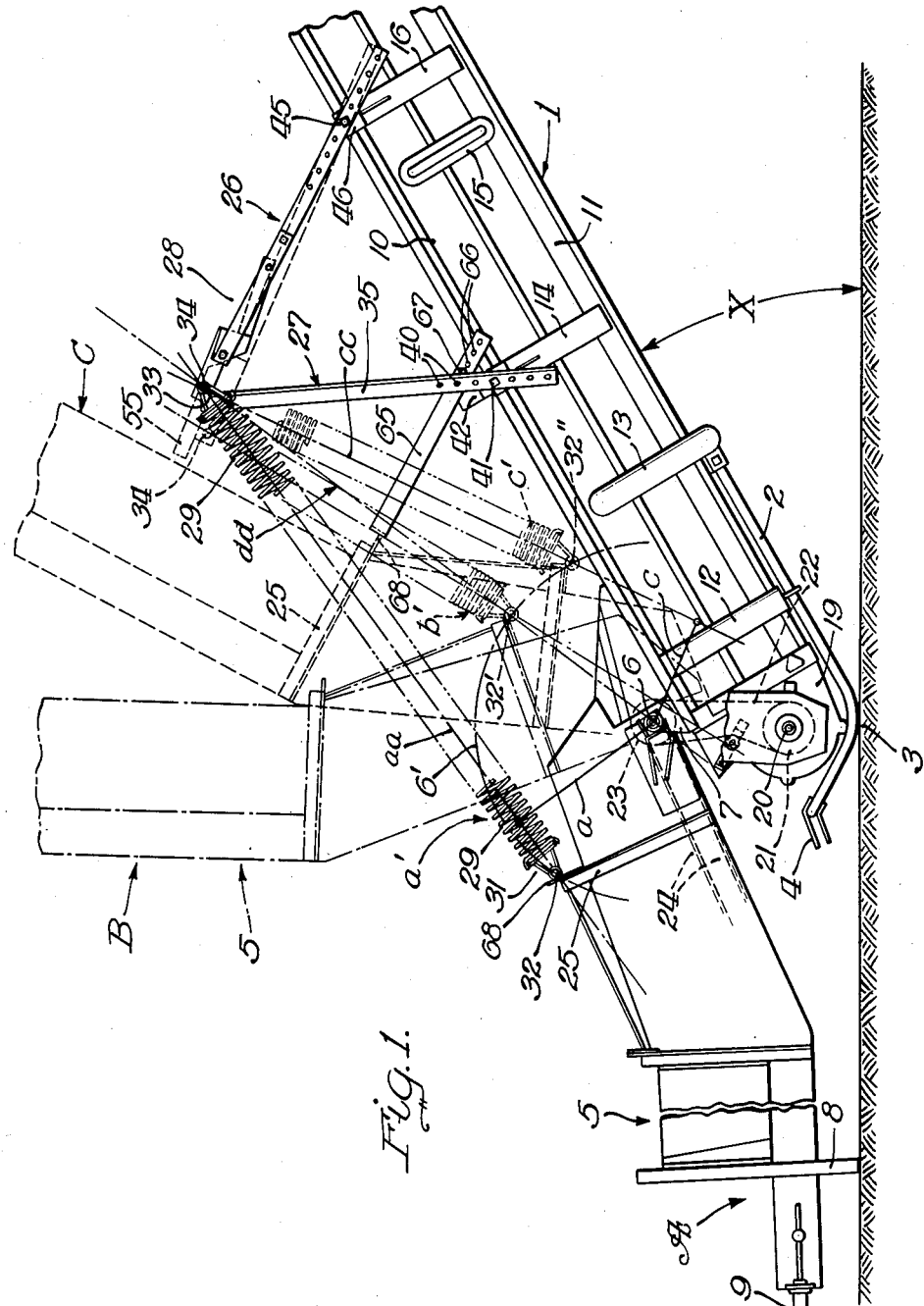
Figure 1 is a fragmentary side elevational view of the ground engaging portion of a conventional conveyor having a tilting hopper pivotally connected therewith and illustrating the mechanism of the present invention as embodied into this particular conveyor arrangement.

Figure 5 is an edge view of the mechanism shown in Figure 4 and as viewed from the right with portions thereof broken away and in section to illustrate further details of construction; and Figure 6 is another side elevational view of the back stay unit showing the same as it would appear in locked relation after it has functioned to move one of the adjacent spring ends into its operative connected position in relation to the conveyor.

As best illustrated in Figure 1, the conveyor of the present invention comprises an elevator 1 that may be supported in any convenient or suitable manner upon a mobile wheel structure as is conventional and which elevator is provided with skids 2 to support the front end of the elevator upon the ground at 3, these skids also including hitch means such as 4 for conveniently towing the entire unit from one place to another.

A tilting hopper 5 is pivotally connected by a cross shaft such as 6 with a bracket 7 mounted upon the elevator 1. This hopper is swingable from the ground engaging position A to a number of intermediate positions, one of which is indicated at B, and then into a subsequent upright position C, both of the positions B and C being indicated in broken lines.

The tilting hopper 5 includes leg means comprising a bail 8 for supporting the outer end of this hopper upon the ground and to position the balance of the hopper in material receiving relation with respect to the elevator 1. Additionally, the forward end of the tilting hopper 5 includes a handle 9 for the convenience of the operator to move the entire hopper about its pivotal shaft 6 into any one of the other positions such as B and C as illustrated in Figure 1.

The elevator is of a conventional form comprising an upper trough 10 and a lower trough 11 comprising portions of the elevator frame which includes connecting brackets such as 12, 13, 14, 15 and 16 that complete a unitary framework for conveying material upon a suitable conveyor chain such as indicated at 17 in Figure 2, which chain carries the usual material moving flights such as 18 there shown.

Referring again to Figure 1, the ground engaging portion of the elevator supports a foot end 19 for supporting the conveyor driving shaft 20 which is connected by means of a suitable sprocket 21 and chain 22 to drive a sprocket wheel 23 through which the drive is transmitted by means of a chain 24 to suitable mechanism in the hopper for feeding the material from the hopper to the elevator 1. Sprocket 23 is suitably mounted upon the cross shaft 6 which also forms the pivotal means between the hopper and the elevator.

The counterbalancing mechanism of the present invention includes briefly a spring bracket or front bail 25 that is secured to the tilting hopper 5 and a spring mounting structure 26 including as its chief elements a spring frame 27 and a back stay assembly 28 mounted upon the elevator 11, both the bail 25 and the bracket 26 comprising the means for mounting springs 29 and 30 as best shown in Figures 1, 2 and 3.

The hopper ends of the springs are each supplied with connecting straps 31 joined to the adjacent ends of the springs and adapted for engaging suitable shaft ends such as 32 which are secured to the front hopper bail 25. With this arrangement, the connecting straps 31 may pivot relatively to the shaft ends 32 during the bodily pivotal movement of the tilting hopper with respect to the elevator 1. The opposite end of the spring 29, as is spring 30, is also provided with a connecting strap 33 which engages over the end of a cross shaft 34 which is best illustrated in Figures 1, 2 and 3.

The spring frame 27 is made up of two angle irons such as 35 and 36 as best seen in Figure 3, and both of these angle irons are suitably connected with a cross angle 37 to which the shafts 34 are welded with the projecting ends 38 and 39 of the shafts being positioned for supporting the adjacent ends of the springs 29 and 30. It should also be noted that the elevator ends of the angle irons 27 are each provided with a plurality of openings 40 for endwise adjustment by means of a suitable nut and bolt arrangement 41 with respect to a bracket 42 carried upon the side of the elevator 1.

Each of the back stay or bracket constructions 28 are best illustrated with reference to Figures 4, 5 and 6. Each of these units comprises a bar 43 having a plurality of openings formed adjacent one end thereof whereby this bar 43 may be secured through bolt means 45 to a bracket 46 carried upon the side of the elevator 1, and the opposite end of the bar includes spaced straps 47 and 48 to carry the over center spring tensioning and locking means 49. Straps 47 and 48 are secured to the bar 43 through the bolt 50 and nut 51. Each of these straps 47 and 48 are provided with aligned apertures such as 52 for releasably receiving a headed pin 53 securable into the position shown in Figure 5 by means of the cotter pin 54, this pin being used for the locking means to securely fasten the spring locking and tensioning means into operative spring holding position.

The spring holding and tensioning means comprises an operating arm 55 having an end aperture 55' for latching engagement with the headed bolt 53, and this arm is pivotally carried upon the bolt 56 which traverses both of the straps 47 and 48. The operating arm 55 is suitably welded or otherwise secured to the pivot plates 57 and 58 which carry the arm upon the pivotal means comprising the bolt 56. The plates 57 and 58 are spaced as best shown in Figure 5, and a tension bar 59 is pivotally carried at 60 upon the pivot plates 57 and 58. The tension bar 59 includes an aperture 61 which is adapted for engaging over one of the ends of the cross shaft 34 which carries the springs 29 and 30. Obviously, as best shown in Figure 3, there are two of the back stay units 26 employed at either side of the spring bracket frame comprising the connected angle units 35, 36 and 37.

Each of the tension bars 59 may be preferably located laterally with respect to the entire bracket structure for supporting the springs by suitably placing them on the projecting ends 38 and 39 of shafts 34 that are carried at each side of the framework. To this point the description has related to dual spring means and bracket equipment that is duplicated adjacent or to either side of the conveyor and more specifically laterally outwardly of the elevator and pivotally connected hopper combination. This has been done for distribution of stresses, to keep the respective parts lighter and easier to handle, for better manual adjustment and assembly, and also to divide the counterbalancing instrumentalities into a pair of springs instead of one heavy and harder to handle resilient unit. For all purposes, the spring means is analogous to a single spring unit since the mode of operation, purpose and construction of the dual unit or a single unit would be identical in their operations when embodied as described.

Referring again to Figures 4, 5 and 6, attention is directed to the pivot plates 57 and 58 in that they carry the operating arm 55 in complete offset relation as shown in Figure 4 with the tension bar 59 extended. This positions the aperture 61 and pivots 60 and 56 all in line with the straps 47 and 48, and in line with the bar 43. When the spring tensioning and locking means 49 is operated to draw the tension bar 59 toward straps 47—48 and toward the pivot bolt 56, the arm 55 is swung through the arc indicated in Figure 6 into a location there shown in full lines and latched in place by the headed bolt or lock pin 53.

In order to maintain the aligned positions of the respective pivots with the opening 61, both for the extended position of the tension bar 59 and in the retracted position as shown in Figures 4 and 6, respectively, the tension bar 59 includes a lateral notch 64 which permits the tension bar 59 to straddle the pivot bolt 56 in the manner shown in Figure 6. Thus the back stay assembly is kept in an aligned assembled relation both for the extended and retracted positions of the tension bar 59 and the operating arm 55 and the respective parts thereof are also maintained in an aligned position with respect to the length of the bar 43 and its connected straps 47 and 48.

In assembling the counterbalancing structure, the operator first secures the spring mounting structure 26 into an adjusted position upon the conveyor elevator 1, and during this operation, the U-shaped stop bail 65 can also be assembled by means of any one of the openings 66 through bolt means 67 to the bracket 42 of the conveyor. In connecting the spring frame 27 and the back stay assembly to the elevator 1, the bolt means 41 and 45 may be reasonably tightened leaving sufficient slack to permit the respective units of the spring frame 27 and the back stay assembly to pivot relative to the frame of the conveyor. The spring supporting ends 33 may be slipped over the shaft ends 34 welded to the spring frame angle 37, and in this operation the spring tensioning and locking means of the back stay units are positioned next with the tension bars 59 extended. In proceeding further with the assembly, the operator or farmer can then position the hopper for pivotal connection by means of the shaft 6 to the conveyor and more specifically to the elevator 1 thereof. The next step in the assembly is to rotate the tilting hopper into a generally vertical and upright position B which brings the connecting stub ends or shaft ends 32 into the location 32' generally coincident with a line intersecting the pivots 6 and 34 as shown in Figure 1. Both of the springs 29 and 30 are tightly wound and prestressed so that they have an inherent tension factor which must first be overcome before the respective helical coils can be separated.

For a given angular position of the inclined flight of the conveyor as indicated by the angle X in Figure 1, and for a given adjusted position of the two main units 27 and 28 of the spring mounting structure, the position of the cross shaft 34 will be such that the distance between this shaft 34 and the position of the stub shafts 32' will receive either one of the springs 29 or 30 in their normally collapsed and inoperative and inherent condition. Both of the springs 29 and 30 can then be placed on to their respective shaft connections which comprise the attachment members between the tilting hopper and the conveyor.

After maintaining the hopper in the position B, and performing the assembly of the springs, the operator can then swing the respective operating arms 55 of the back stay assemblies into their latched positions between straps 47—48 where they are secured by means of the locking bolt or pin 53. In performing the latter function, it should be noted that the outer ends of the angle irons 35 and 36 of the spring frame 27 will pivot about the axis of the fastening units 41 causing the ends of the angle irons to describe an arc comprising a portion of the curved line M (see Figure 2) which is concentric with respect to the bolt means 41. Obviously, the ends of the back stay units as defined by shaft 34 and the operating arm 55 will also tend to follow the same curvature since both of the spring frame members and the back stay units are connected by the aligned shafts 34 at the ends of the cross angle 37.

The operation of both of the operating arms 55 of the spring tension locking means 49 respectively functions to increase the distance between the axes of the stub shafts 32 in location 32' and the location of the cross shafts 34 which will introduce a given amount of tension into the springs 29 and 30 so that there will be an active amount of tensioning by the springs even during the time that the tilting hopper is swung through a generally upright position B. Thus the hopper will be entirely under the control of the springs through its swingable arc of operation between the points where the leg unit 8 touches the ground and wherein the bail 25 has an end portion 68 thereof positioned at rest upon the elevator stop bail 65.

Referring again to Figure 1, it should be noted that springs 29 and 30 are inherently affected and stretched considerably along an axial line $aa$ which bisects the connecting members 32 and 34 so that the tensioning stresses of the springs operate through a comparatively large torque arm $a$ located to one side of the center of the pivotal means 6. It should also be noted that the pivotal member 32 follows the arcuate path indicated as 6' which is concentrically located with respect to the shaft 6 so that members 32 pass through the intermediate position 32' and also to a maximum position 32" which is attained at the time that the tilting hopper assumes the position C in nested or stored relation against the stop bail 65. When the springs 29 and 30 are located along the axis $cc$ bisecting the positions 34 and 32", the power of the springs and the inherent stresses therein act along the line $cc$ and through another relatively large torque arm $c$ which is positioned to the opposite side of the pivotal center of the shaft 6 with respect to the similar torque arm $a$.

Thus with the particular construction and arrangement of the respective members 32 and 34 in relation to the hopper and conveyor and to the pivotal means 6, it is possible to obtain the considerable initial aiding force through the springs 29 and 30 when in line with the positions $aa$ to aid an operator to swing the hopper about its pivot 6 by gripping the handle 9 or other hopper part within the operator's reach. As the springs 29 and 30 diminish in length, they also become proportionately de-energized but at the same time the overhanging weight of the tilting hopper will also be brought into a closer approach to a vertical position wherein the effective force for holding the hopper in an angled position is also proportionately less.

Then by bringing the hopper into the nested or stored position C above the elevator 1, the springs 29 and 30 assume the positions in line with the axes $cc$ which provide a reserve tensional force which will aid an operator in swinging the tilting conveyor from a position C toward the position B and down to the operative loading position as shown at A. During the movements of the hopper 5 between its limiting positions A and C, it should be noted that the springs 29 and 30 will traverse a portion of the arc 6' along the intermediate axes $dd$ which, when projected generally from the attached position of the shaft 34 on the spring mounting structure through the position 32', will also bisect the pivotal means 6 so that the pull of the springs are directly in line with the pivotal mountings of the hopper on the elevator 1. Any movement of the springs generally along the axes $dd$ and adjacent each side thereof considered radially with respect to the pivotal means 34, will be ineffective as far as the tilting hopper is concerned since the respective angularities of the hopper in an upright position and to either side thereof will create the situation where the entire hopper is in balance and supported directly upon the pivotal means 6. To either side of this generally upright or vertical position, however, the hopper will be brought into a cooperative stressed relation with respect to the positions of the springs and the torque arms through which they react to aid the operator in moving the hopper.

When changing the angularity of the elevator 1 with respect to the ground as indicated at X, it is desirable to maintain the position of the spring fastening point and shaft 34 in the proper working relationship with respect to the other mechanisms of the counterbalancing structure. Thus, as the elevator angle is made greater, the shaft 34 will swing counterclockwise so that the respective elements of the spring frame 27 and back stay 28 should be adjusted downwardly for the purposes of obtaining a similar adjustment for the springs 29 and 30 to act along the axes $cc$ to aid in giving similar help to an operator in bringing the tilting hopper forwardly and toward the ground. This same adjustment will also automatically position the springs 29 and 30 in a selected proper relationship along the axes $aa$ and with the proper distention or energization to again obtain a suitable lift to aid an operator in moving the tilting hopper from the ground position A upwardly into the position C. Other adjustments may then be regulated according to the nested position desired for the hopper by means of shifting the bail 65 to determine the stop position of the hopper in position C shown in Figure 1.

The foregoing description has been directed to a preferred construction of counterbalancing means operatively embodied into a swingable hopper that is pivotally connected with the material conveying frame of an elevator. Certain changes in the exact construction of the various parts and elements as well as in the combination thereof are contemplated without departing from the fundamental scope of the present invention. Such deviations and modifications shall, however, be governed by the breadth and scope of the appended claims directed to this invention.

What I claim is:

1. In a conveyor, an elevator, a tilting hopper, pivotal means connecting said hopper with said elevator, and counterbalancing means for moving said hopper connected between said hopper and elevator comprising at least one spring member, a spring attachment member on said hopper, and a spring holding frame member on said elevator, all of said members being positioned and arranged to cause said spring member to pass through an intermediate neutral minimum stressed position as said hopper is actuated between operative and inoperative positions, said spring member occupying maximum stressed relations when disposed in said latter two positions, and said spring holding frame member comprising a compression frame and a back stay assembly having tensioning mechanism associated therewith and arranged to provide a minimum initial tensional expansion in said spring member when said latter member is disposed in said neutral and minimum stressed relation, and pivotal mechanism connecting said compression frame and said back stay assembly at the spring member securing end thereof, said compression frame and said assembly each being swingably connected with said elevator, and fastening means to secure said compression frame and back stay assembly in fixed relation with respect to said elevator to fix the location of the point of connection of said spring member with respect to said elevator, and adjustable means associated with said compression frame and back stay assembly, respectively, and adapted for shifting the elevator ends of said compression frame and said back stay assembly to vary the location of the attached spring member end with respect to said elevator.

2. In a conveyor, an elevator, a tilting hopper, pivotal means connecting said hopper with said elevator, and counterbalancing means for moving said hopper connected between said hopper an delevator comprising at least one spring member, a spring attachment member on said hopper, and a spring holding frame member on said elevator, all of said members being positioned and arranged to cause said spring member to pass through an intermediate neutral minimum stressed position as said hopper is actuated between operative and inoperative positions, said spring member occupying maximum stressed relations when disposed in said latter two positions, and said spring holding frame member comprising a compression frame and a back stay assembly having tensioning mechanism associated therewith and adapted for providing a minimum initial tensional expansion in said spring member when said latter member is disposed in said neutral and minimum stressed relation, and securing mechanism to connect the outer end portions of said compression frame and said back stay assembly, said compression frame and said assembly each having their elevator end portions swingably connected with said elevator, and fastening means to secure said compression frame and back stay assembly in fixed relation with respect to said elevator, and said securing mechanism including cross shaft means spaced from said elevator and adapted to receive the adjacent end of said spring member.

3. In a conveyor, an elevator, a tilting hopper, pivotal means connecting said hopper with said elevator, and counterbalancing means for moving said hopper connected between said hopper and elevator comprising at least one spring member, a spring attachment member on said hopper, and a spring holding frame member on said elevator, all of said members being positioned and arranged to cause said spring member to pass through an intermediate neutral minimum stressed position as said hopper is actuated between operative and inoperative positions, said spring member occupying maximum stressed relations when disposed in said latter two positions, and said spring holding frame member comprising a compression frame and a back stay assembly, and securing mechanism connecting the remote spring member receiving end portions of said compression frame and said back stay assembly, said compression frame and said assembly each having their elevator end portions pivotally connected with said elevator, and fastening means to secure said compression frame and back stay assembly in fixed relation with respect to said elevator, and said securing mechanism including an over center tensioning mechanism connecting said back stay assembly, compression frame and said spring member to induce initial tension in said spring member.

4. In a conveyor having a material handling elevator, a tilting elevator feed hopper, and pivotal means connecting said elevator and hopper to permit said hopper to swing between operative material receiving position upon the ground and a tilted stored position upon said elevator, the combination of a counterbalancing means for said hopper to assist in lifting said hopper from either the operative or stored positions for movement about said pivotal means between the terminal positions of said hopper comprising a spring unit, attachment members to connect said spring unit with said hopper and said elevator respectively, fixed means on said elevator to secure said elevator spring attachment member in an upwardly spaced relation with respect to the elevator and remote from the pivotal means connecting said elevator and hopper, and a second fixed means connected with said hopper in offset relation to said pivotal means and movable in an arc about said pivotal means and between the latter and said first fixed means to actuate said second fixed means toward and away from said first fixed means on said elevator to provide two expanded positions of said spring unit coincident with the operative and inoperative positions of said hopper, and whereby said spring unit occupies a minimum contracted relation as said second fixed means is actuated through the zone disposed between said pivotal means and said first fixed means.

5. In a conveyor having a material handling elevator, a tilting elevator feed hopper, and pivotal means connecting said elevator and hopper to permit said hopper to swing between operative material receiving position upon the ground and a tilted stored position upon said elevator, the combination of a counterbalancing means for said hopper to assist in lifting said hopper from either the operative or stored positions for movement about said pivotal means between the terminal positions of said hopper comprising a spring unit, attachment members to connect said spring unit with said hopper and said elevator respectively, fixed means on said elevator to secure said elevator spring attachment member in an upwardly spaced relation with respect to the elevator and remote from the pivotal means connecting said elevator and hopper, and a second fixed means connected with said hopper in offset relation to said pivotal means and movable in an arc about said pivotal means and between the latter and said first fixed means to actuate said second fixed means toward and away from said first fixed means on said elevator to provide two expanded positions of said spring unit coincident with the operative and inoperative positions of said hopper, and whereby said spring unit occupies a minimum contracted relation as said second fixed means is actuated through the zone disposed between said pivotal means and said first fixed means, and operative mechanism interposed between said first fixed means and said elevator to coact with said spring unit to provide said spring unit with a predetermined amount of minimum tension for said minimum contracted relation of said spring unit.

6. In a conveyor, an elevator, a feed hopper for said elevator, pivot means to mount said hopper on said elevator for swinging movement between operative ground engaging position and inoperative raised and stored position lying upon the elevator, and counterbalancing mechanism for said hopper to assist an operator in swinging said hopper in either direction between the aforesaid positions comprising a spring unit, a first attachment member to connect one end of said spring unit with said elevator, and a second attachment member to connect the other end of said spring unit with said hopper, said second attachment member being carried upon said hopper at a point arranged to one side of a plane coincident with the axes of said pivot means and said first attachment member respectively when said hopper occupies one of its limiting positions, movement of said hopper to its other limiting position providing means to carry said point of connection of said second attachment member in an arc toward said reference plane and to the other side of the plane automatically causing said spring unit to contract intermediate the limiting positions of said hopper but to expand to either side of said plane to assist in moving said hopper from either one of its limiting positions to the other thereof.

7. In a conveyor, an elevator, a material feed hopper swingably mounted upon said elevator and movable from a prone ground engaging position through a balanced upright position and into a prone stored position upon said elevator or vice versa, and counterbalancing means to assist in swinging said hopper from either prone position to the other comprising a spring unit, a first attachment means to secure one end of said spring unit in a given relation with respect to said elevator, a second attachment means on said hopper to secure the other end of said spring unit to said hopper and in a position wherein one end of said spring unit is rocked about the axis of said first attachment means as said hopper actuates said second attachment means to cause the other end of said spring unit to describe an arc generated about the swingable hopper axis toward and away from said first attachment means to alternately expand and contract said spring unit, said spring unit being expanded in each of the prone positions of said hopper and contracted in an intermediate position coincident with the upright position of said hopper.

8. In a conveyor, an elevator, a material feed hopper swingably mounted upon said elevator and movable from a prone ground engaging position through a balanced upright position and into a prone stored position upon said elevator or vice versa, and counterbalancing means to assist in swinging said hopper from either prone position to the other comprising a spring unit, a first attachment means to secure one end of said spring unit in a given relation with respect to said elevator, a second attachment means on said hopper to secure the other end of said spring unit to said hopper and in a position wherein one end of said spring unit is rocked about the axis of said first attachment means as said hopper actuates said second attachment means to cause the other end of said spring unit to describe an arc generated about the swingable hopper axis toward and away from said first attachment means to alternately expand and contract said spring unit, said spring unit being expanded in each of the prone positions of said hopper and contracted in an intermediate position coincident with the upright position of said hopper, said first attachment means comprising an adjustable bracket structure connected with said elevator and including tensioning mechanism to secure the adjacent end of said spring unit to said bracket and to establish a predetermined tension in said spring unit.

References Cited in the file of this patent

UNITED STATES PATENTS

| | | |
|---|---|---|
| 474,010 | Grube | May 3, 1892 |
| 977,518 | Feldt | Dec. 6, 1910 |
| 2,577,328 | Hyman | Dec. 4, 1951 |